(12) United States Patent
Zhai (10) Patent No.: US 11,434,950 B2
(45) Date of Patent: Sep. 6, 2022

(54) QUICK-ASSEMBLY FURNITURE DESIGN AND A METHOD OF USING THE SAME

(71) Applicant: Ningbo Ego International Co., Ltd., Ningbo (CN)

(72) Inventor: Yiquan Zhai, Shanghai (CN)

( * ) Notice: Subject to any disclaimer, the term of this patent is extended or adjusted under 35 U.S.C. 154(b) by 0 days.

(21) Appl. No.: 17/009,782

(22) Filed: Sep. 2, 2020

(65) Prior Publication Data

US 2022/0065277 A1    Mar. 3, 2022

(51) Int. Cl.
*F16B 12/32*    (2006.01)
*A47C 5/04*    (2006.01)
*A47B 3/06*    (2006.01)
*A47B 13/00*    (2006.01)
*A47C 5/10*    (2006.01)

(52) U.S. Cl.
CPC ............ *F16B 12/32* (2013.01); *A47B 3/06* (2013.01); *A47B 13/003* (2013.01); *A47C 5/043* (2013.01); *A47C 5/10* (2013.01)

(58) Field of Classification Search
CPC .......... B60N 2/682; F16B 12/32; A47B 3/06; A47B 13/003; A47B 47/00; A47B 63/00; A47C 5/10; A47C 4/02; A47C 4/028
USPC ............... 108/180, 153.1; 297/440.1, 440.2
See application file for complete search history.

(56) References Cited

U.S. PATENT DOCUMENTS

| | | | | |
|---|---|---|---|---|
| 3,506,138 A * | 4/1970 | Travis | ................... | A47B 55/02 108/91 |
| 4,062,607 A * | 12/1977 | Locatelli | ............... | A47B 63/00 312/258 |
| 4,077,517 A * | 3/1978 | Hilemn | .................... | A47C 4/02 206/577 |
| 4,305,616 A * | 12/1981 | Martinez | ............... | A47C 4/028 297/440.15 |
| 4,886,326 A * | 12/1989 | Kuzyk | ............... | A47B 47/0041 312/257.1 |
| 6,557,955 B2 * | 5/2003 | Saravis | ................... | F16B 12/26 312/111 |
| 7,124,695 B2 * | 10/2006 | Buechler | ............... | A47B 45/00 108/180 |
| 8,955,928 B2 * | 2/2015 | Cheng | ............... | A47B 47/0033 312/265.2 |
| 2005/0179303 A1 * | 8/2005 | Owens | .................... | A47C 4/02 297/440.1 |
| 2008/0184917 A1 * | 8/2008 | Liu | ..................... | A47B 13/003 108/157.16 |
| 2019/0072122 A1 * | 3/2019 | DeSmet | ................. | F16B 12/10 |
| 2021/0100356 A1 * | 4/2021 | Huang | .................... | A47B 9/04 |
| 2021/0186210 A1 * | 6/2021 | Bohr | .................... | A47B 63/00 |

FOREIGN PATENT DOCUMENTS

| | | | | |
|---|---|---|---|---|
| DE | 202020102073 U1 * | 6/2020 | ............ | F16B 12/04 |
| KR | 200465801 Y1 * | 3/2013 | | |
| KR | 101415056 B1 * | 8/2014 | | |
| KR | 20140134892 A * | 11/2014 | | |
| WO | WO-2021041680 A1 * | 3/2021 | .......... | A47B 13/021 |

* cited by examiner

*Primary Examiner* — Jose V Chen
(74) *Attorney, Agent, or Firm* — WPAT Law, P.C.; Anthony King (57) ABSTRACT

A furniture system implementing an internal frame in each panel pieces where the panel pieces can be easily and securely coupled together using toggle latches. Further, the toggle latches can have a safely lock to minimize and prevent accidental disassembling.

15 Claims, 8 Drawing Sheets

QUICK-ASSEMBLY FURNITURE DESIGN AND A METHOD OF USING THE SAME

FIELD OF THE DISCLOSURE

The present disclosure relates to a furniture system, more particularly, a system allowing quick, easy, and secure assembly of a furniture piece

BACKGROUND OF THE DISCLOSURE

Generally, a piece of furniture such as a sofa or a table is fully assembled at the factory to ensure the proper structural integrity of each piece is maintained by the time the furniture piece is delivered to the end consumer. In recent years it has been known that substantial savings in storage and shipping costs can be achieved by selling unassembled pieces of furniture where the end consumer is required to assemble the part together.

Assembling a furniture piece together takes time, patience, tools, and skills. Known unassembled furniture pieces is often accompanied by a hex key, a bag of fasteners (i.e., screws, bolts, washers) of various lengths and sizes, and a complicated installation manual with figures. Some installation manuals are too long-winded with pages and pages of text, while some others are too simplified with only drawing figures and no text, leaving much to the end consumer's imagination.

The enclosed bag of fasteners and tools can be intimidating for some end consumers, especially those who are not handy. Also, when a screw goes missing either from the factory or during the assembling by the end consumer, the assembling process would have to be stopped until such missing part is replaced with a new part from the manufacturer.

There is a continuing need for new ways to allow an end consumer to assemble a furniture piece together.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned needs. Although the present embodiments may obviate one or more of the above-mentioned needs, it should be understood that some aspects of the embodiments might not necessarily obviate them.

BRIEF SUMMARY OF THE DISCLOSURE

In a general implementation, a furniture system includes an internal frame wherein the frame may include hollow metal tubes or boards. The board can be wooden boards, particle boards, and boards made of natural and synthetic materials.

In another aspect combinable with the general implementation, at least one type of the furniture pieces is patio furniture capable of quick assembly and disassembly.

In another aspect combinable with the general implementation, the furniture piece can include an armchair, a sofa, an ottoman, a coffee table, a side table, a chaise, In another aspect combinable with the general implementation, the furniture piece can be assembled from individual panel pieces, wherein each individual panel piece is at least partially covered by an outer covering, such as synthetic rattan.

In another aspect combinable with the general implementation, wherein the individual panel pieces can be coupled to each other via toggle latches that are secured to each panel at the factory.

In yet another aspect of the disclosure, the toggle latches can have a safety lock to prevent accidental release of the toggle latch. Such safety feature can allow the toggle latches to remain in a locked position until the end user manually release the safety and unlatch the hardware.

In some embodiments, the toggle latch can have an internal spring that biases a transverse plate into a locking position. There can be provided a push button for a user to release the transverse plate thereby allowing the toggle latch to unlatch.

In one aspect of the disclosure, the toggle latches are accessible to a consumer as these latches can be exposed through the uncovered portion of each panel piece. In another aspect of the disclosure, the toggle latches are hidden from plain view and can be accessible from an underside or unexposed side of each panel piece. The contemplated furniture system can allow fast and easy disassembly of a furniture piece by given a consumer access to the toggle latches from underneath the furniture. In other embodiments, when the contemplated furniture piece is assembled, the toggle latches can be accessed only by tipping the furniture piece off to the side or upside down to expose the interior of the furniture piece.

As briefly mentioned above, the internal frame of each panel piece can be made of metal tubes to form a hollow cast onto which an outer covering can be installed at the factory. The cast with the hollow center can provide enough spacing where the factory can install toggle latches or any other types of couplers.

In still yet another aspect of the disclosure, the furniture piece can be a patio furniture piece such as a modular sofa, an armchair, a coffee table, a side table, or an ottoman. The contemplated furniture system allows an end consumer to easily and quickly assemble the furniture pieces as needed. This also provides a fast and secure way for event planning companies to provide the services of furniture piece rental and assembly at events.

Accordingly, the present disclosure is directed to a furniture assembly/disassembly system. Each panel piece can be in a generally flat configuration to maximize space during storage and transport.

While this specification contains many specific implementation details, these should not be construed as limitations on the scope of any inventions or of what may be claimed, but rather as descriptions of features specific to particular implementations of particular inventions.

Certain features that are described in this specification in the context of separate implementations can also be implemented in combination in a single implementation. Conversely, various features that are described in the context of a single implementation can also be implemented in multiple implementations separately or in any suitable subcombination.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

The following call-out list of elements in the drawing can be a useful guide when referencing the elements of the drawing figures:

1 Coffee table
2 Armchair
3 Sofa
4 Chaise
5 Side table
600 Internal frame
611 Top panel
612 Side panel
613 Cross bar
615 Peg
616 Hole
620 Outer covering
650 Covering
700 Toggle latch
710 Base plate
711 Screw hole
713 Vertical support plate
714 Through hole
715 Locking arm
716 Ramp surface
719 Shaft
720 Housing
721 Opposing wall
722 Through hole
723 Catch arm
724 Slot
725 Transverse plate
726 Spring
727 Locking edge
728 Push button
729 Thumb extension
730 Hook bracket
731 Hook
732 Screw hole
740 Extension leg

DETAILED DESCRIPTION OF THE EMBODIMENTS

The different aspects of the various embodiments can now be better understood by turning to the following detailed description of the embodiments, which are presented as illustrated examples of the embodiments as defined in the claims. It is expressly understood that the embodiments as defined by the claims may be broader than the illustrated embodiments described below.

The inventor has discovered a quick, easy, and secure way to assemble furniture pieces on demand. The contemplated system and method can also allow an end consumer to quick disassemble the furniture pieces for easy storage and transport.

Figure 1:
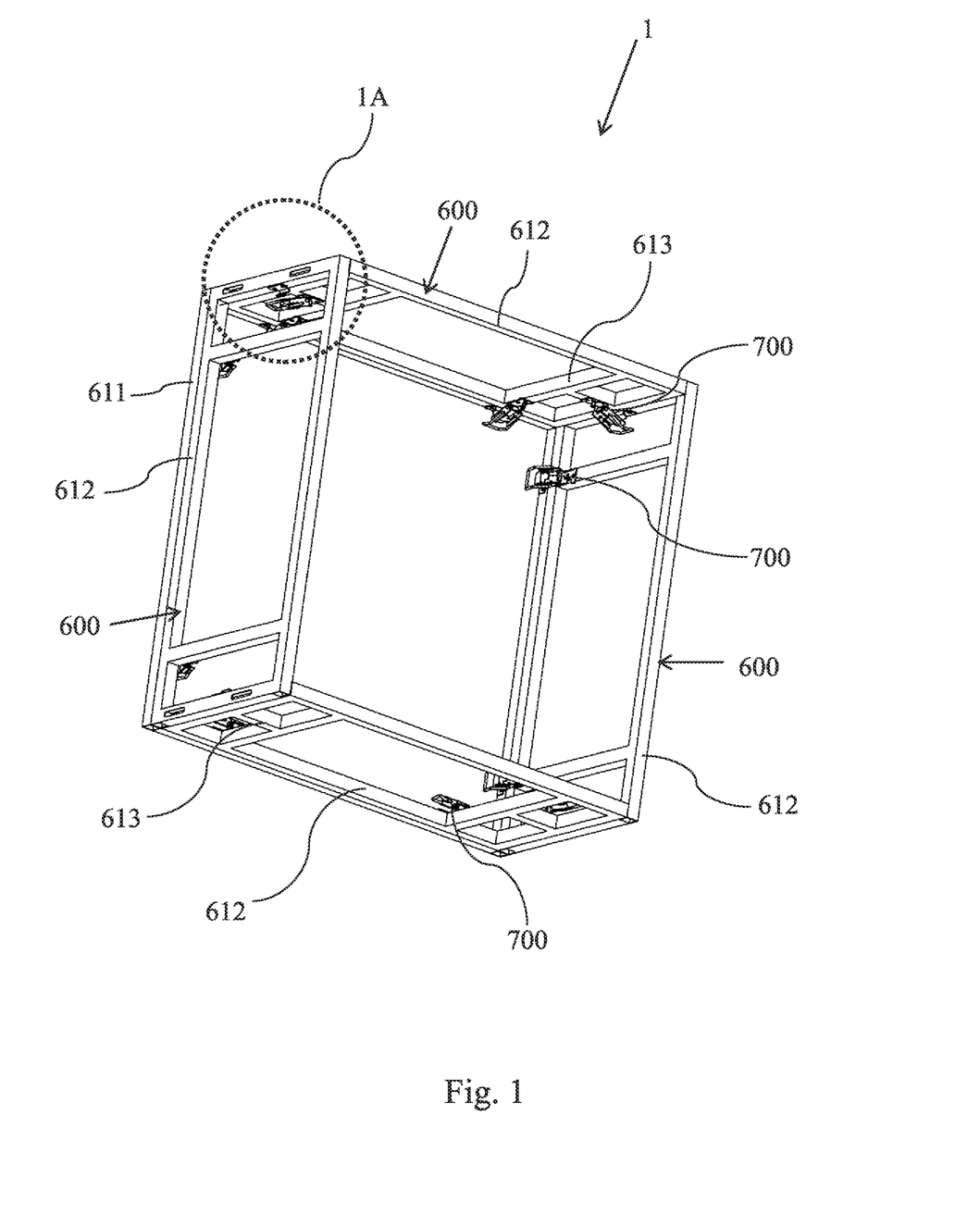
FIG. 1 is a bottom perspective view of an embodiment of a coffee table having separate panel pieces coupled together (outer covering not shown for ease of illustrating the toggle latches) according to an aspect of the disclosure.

Referring now to FIG. 1, where the contemplated internal frame is being implemented in a coffee table 1.

FIG. 1 shows the underside of the coffee table 1. This embodiment of coffee table 1 can be made of four panels: one piece of top panel 611 and three pieces of side panels 612. It should be noted that a panel, whether it is a top panel 611 or a side panel 612, generally includes an internal frame 600 and an outer covering. Here, the outer covering is not shown for purposes of easier illustration of couplers (e.g., toggle latch 700) and their locations. In this embodiment, the four side panels 612 are identical in dimension because the top panel 611 has a square shape and the overall height of the coffee table 1 is the same. Therefore, on each for four equal sides of the top panel 611 is coupled to a side panel 612. Each of the four side panels 612 are also coupled to two adjacent side panels 612. The internal frame 600 of each of the top panel 611 and side panels 612 can be made of metal tubes. Here, a hollow metal tube having a square cross-sectional shape is shown as one particular implementation.

Also, each of the top panel 611 and side panels 612 can have additional cross bars 613 where needed. The cross bars 613 can provide additional structural support to a panel and can provide a physical structure where toggle latches 700 can be installed. For example, in FIG. 1, the side panels 612 on the left and right side of the figure has additional cross bars 613. At the bottom right corner of the furniture frame shown in FIG. 1, a toggle latch 700 is installed on such additional cross bar 613 of the right side panel 612.

The toggle latches 700 can be installed on the interior of each top and side panels 611, 612 so that once the furniture piece is assembled, these toggle switches are hidden from plain sight when the furniture piece is in use.

Each of the top panel 611 and side panels 612 can have an exterior side that would be covered by an outside covering for a desired aesthetic look. Here, the exterior side of each of such panels 611, 612 are shown to be flat because the panels themselves are formed with generally flat frame configuration. That is, with an outer covering installed, the outer covering would be stretched across the internal frames 600 and would be presented to have a flat surface.

Again, each of the toggle latches 700 is contemplated to be installed behind the exterior side of a panel. In other words, toggle latches 700 can be provided on these panels 611, 612 so that while the toggle latches 700 are not in plain view from the outside, they are accessible from an interior side of each panel. In one aspect of the contemplated embodiment, the top panel 611 and side panels 612 are prefabricated with outer coverings on at least one side while having toggle latches 700 installed and accessible from uncovered portions of the panels 611, 612.

In another aspect of the contemplated embodiments, top panel 611 and side panels 612 do not require any other couplers such as screws, nails, clamps as part of their assembling process.

Figure 1A:
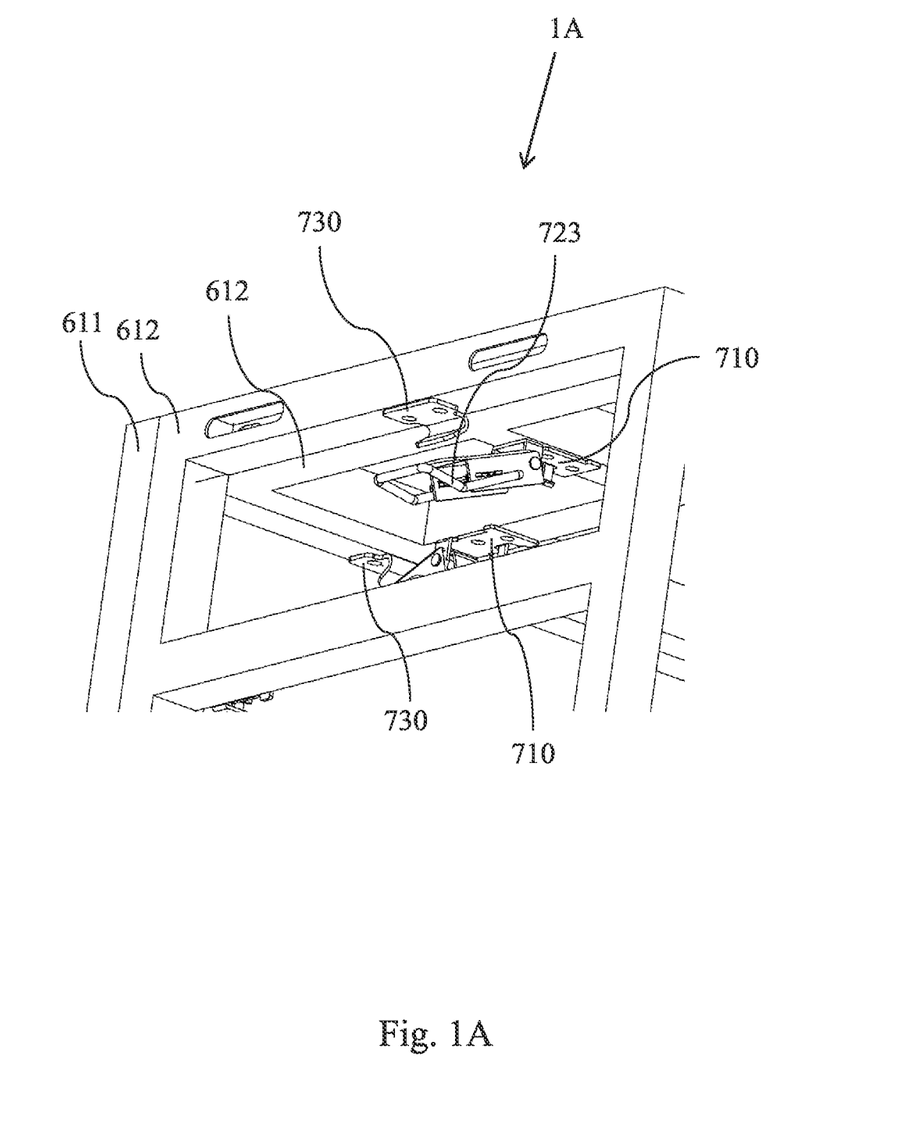
FIG. 1A is a close-up view of the area encircled "1A" in FIG. 1, showing details of the toggle latches that couple separate panel pieces together, according to an aspect of the disclosure.

Referring now to FIG. 1A, which is a close-up view of the area encircled and marked "1A" in FIG. 1. FIG. 1A shows the toggle latches 700 in more detail. A toggle latch 700 can include a base plate 710, a catch arm 723, and a corresponding hook bracket 730. The catch arm 723 can be pivotally coupled to the base plate 710, which can be secured to an internal frame of a side panel 612. Its corresponding hook bracket 730 can be secured to the internal frame of an adjacent side panel 612.

This disclosure also provides a desirable method in directing an end consumer to quickly and easily match up panels 611, 612 during assembly. When a base plate 710 and a catch arm 723 does not match up with a hook plate 730, it can be an immediate indication to the end user that one of the panels 611, 612 is misplaced or misaligned.

Figure 2:
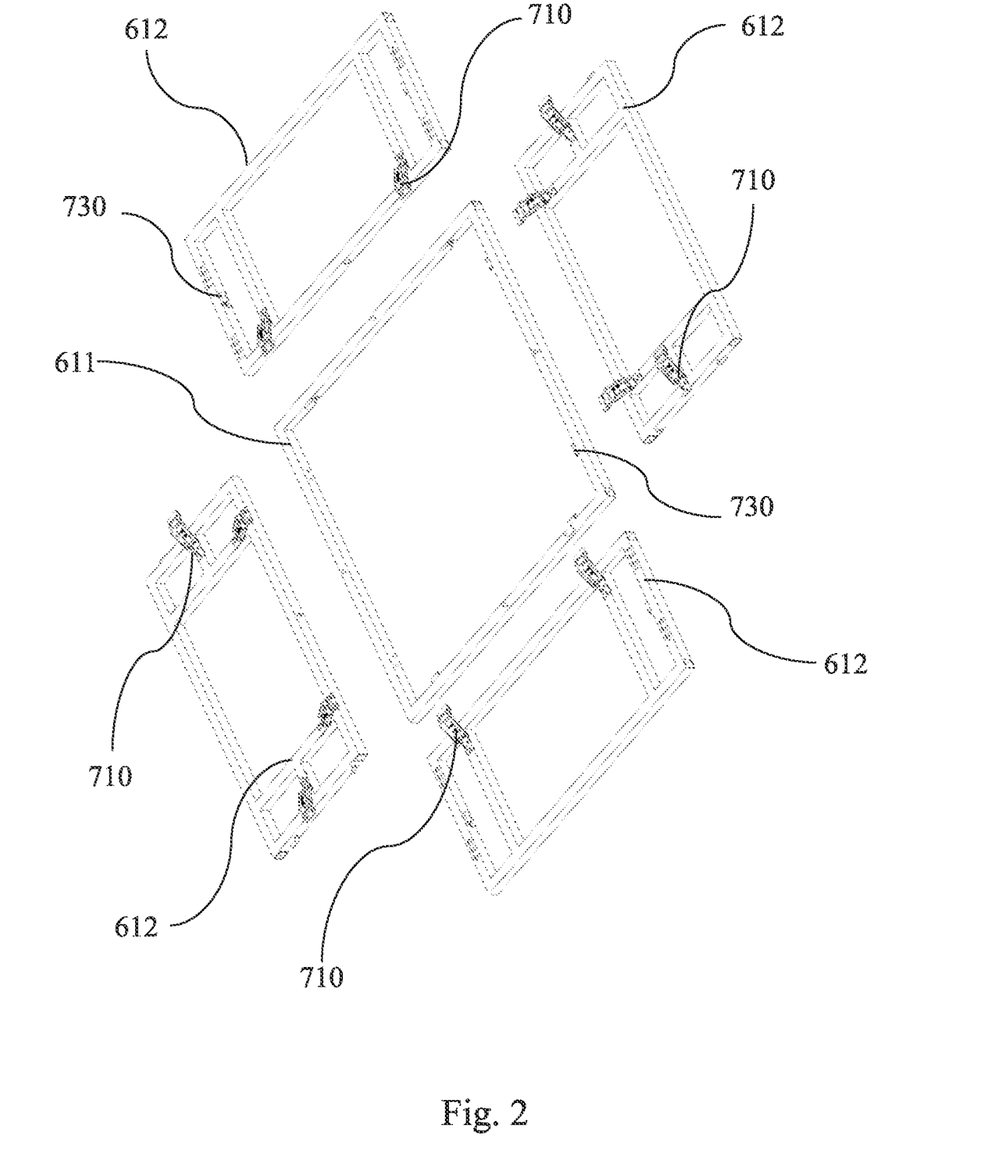
FIG. 2 is a perspective view of the different panels of FIG. 1 in a disassembled state, according to an aspect of the disclosure.

When the top panel 611 and four side panels 612 are disassembled, they may look like what's shown in FIG. 2. In FIG. 2, the outer covering of each panel 611, 612 are not shown for purposes of better illustrating the toggle latches 700. Here, each base plate 710 and 723 catch arm combination matches up with a corresponding hook plate 730 in an adjacent panel 611, 612.

Figure 3:
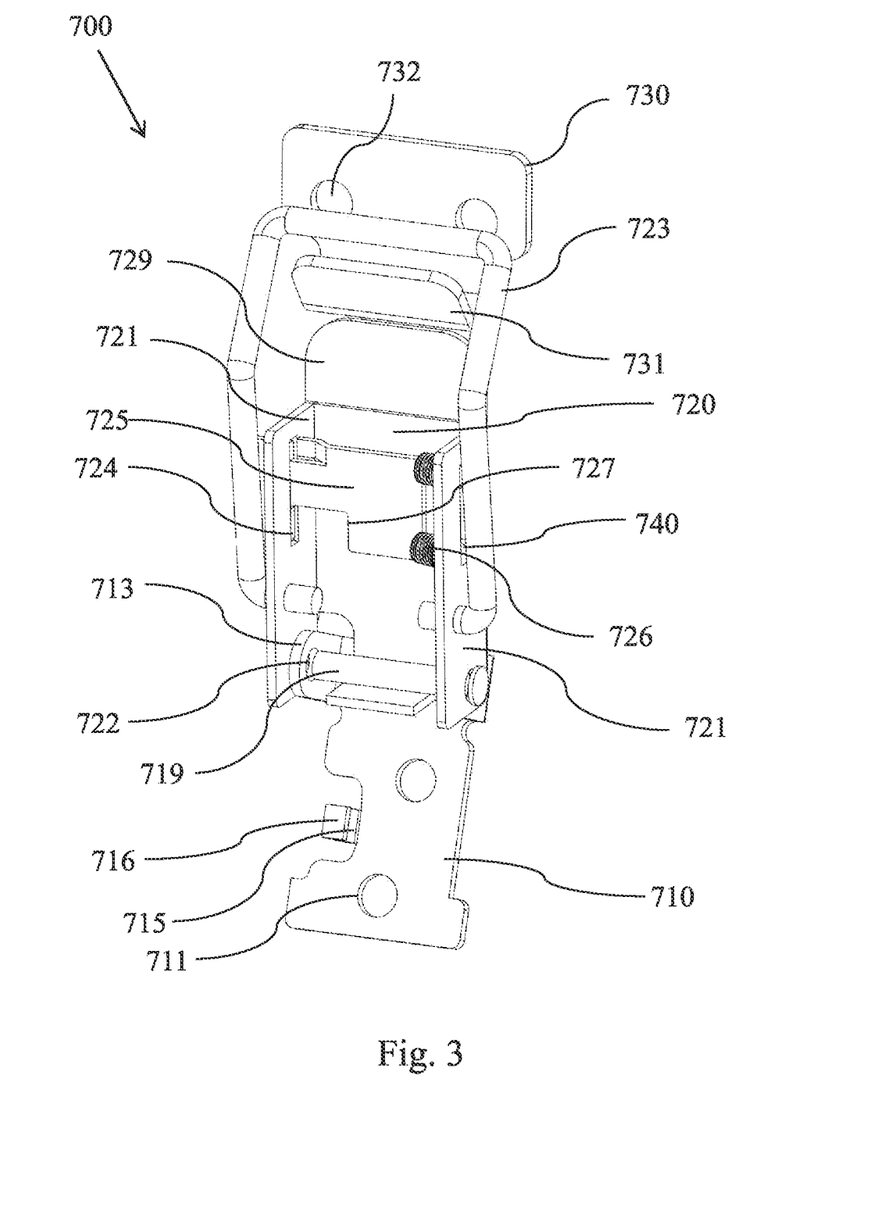
FIG. 3 is a perspective view of one embodiment of the lockable toggle latch illustrated in FIGS. 1-3, according to an aspect of the disclosure.
Figure 4:
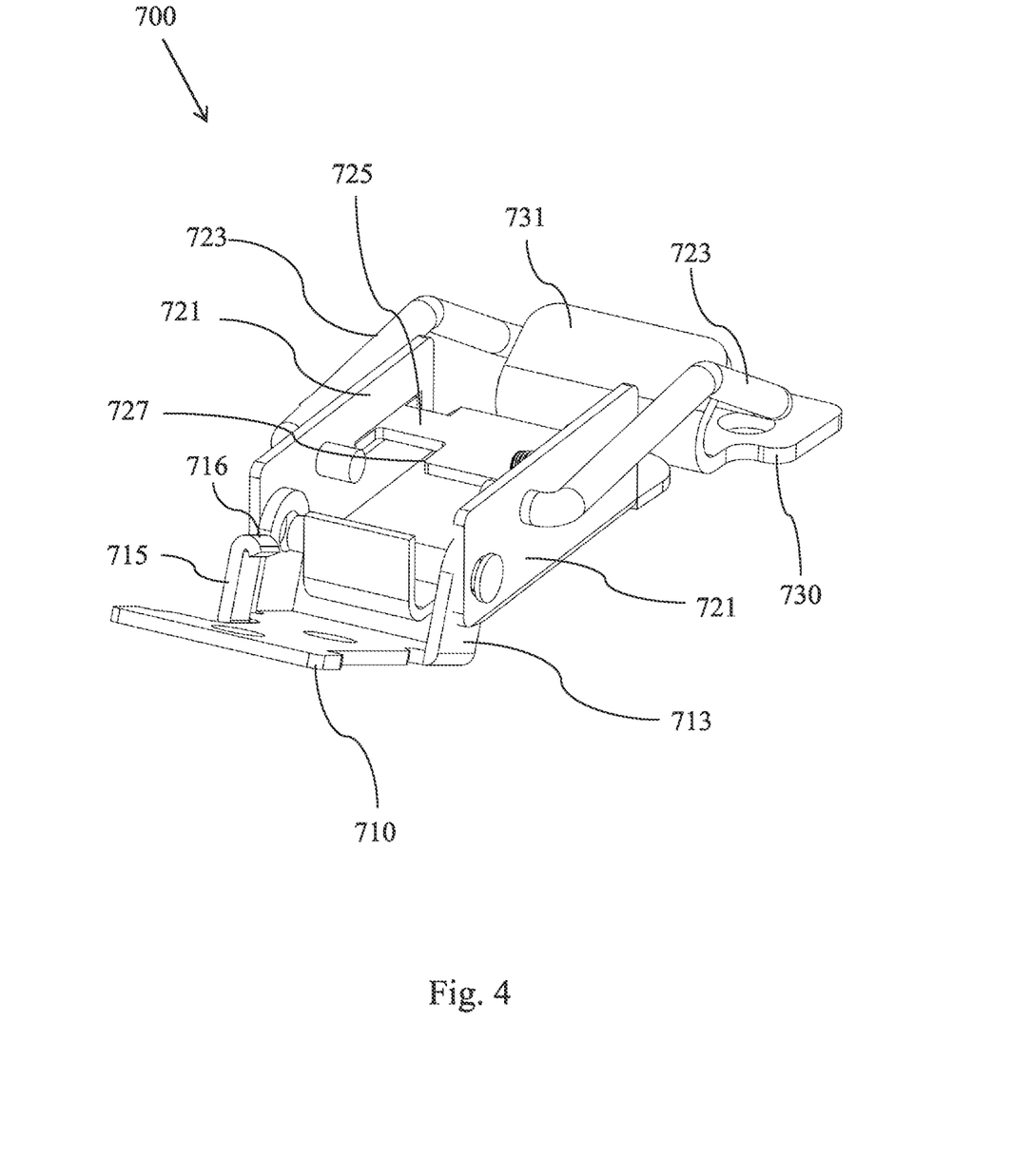
FIG. 4 is a perspective view from a different angle of the lockable toggle latch of FIG. 3, according to an aspect of the disclosure.

In FIG. 3, a contemplated toggle latch 700 can have a base plate 710 having screw holes 711. The screw holes 711 allow the base plate 710 to be securely fastened to an internal frame 600 of a panel 611, 612. Off to the lateral side of the base plate 710 is an erected locking arm 715 that projects in a direction perpendicular to a plane of the base plate 710. The locking arm 715 is fixedly disposed on the base plate 710 and does not move relative to the base plate 710. In one embodiment, it can be an integral part of the base plate 710. The locking arm 715 can have a ramp surface 716 and a notch, or hook, on the opposite side of the ramp surface. The structure of the locking arm 715, ramp surface 716, notch/hook can be easily seen in FIG. 4. In FIG. 4, the ramp surface 716 is shown to be a curved-back elbow, giving the locking arm 715 a fishhook cross sectional shape. Many other shapes can be possible, such as a straight slanted ramp (e.g., single or double blade arrowhead shape) and a notch on its opposite side.

Returning to FIG. 3, the base plate 710 can have two vertical support plates 713 disposed on the opposite sides of each other on a distal end of the base plate. These vertical support plates 713 can be an integral part of the base plate 710, made from the same piece of material. The vertical support plates 713 can erect perpendicularly from a plane of the base plate 710. Each of the vertical support plates 713 can have a through hole 722 allowing a shaft 719 to pass therethrough.

Pivotally connected to the base plate 710 is a housing 720. In one embodiment, the housing 720 can be made of a sheet of metal with two sides bent into two opposing walls 721. The two opposing walls 721 can erect perpendicularly relative to the central portion of the housing 720. At one end of housing there can be a through hole on each of the two opposing walls 721 coaxial with the shaft 719. Shaft 719 can be disposed through the two opposing walls 721 and the two vertical support plates 713, thereby coupling the housing 720 to the base plate 710, and pivots relative to the base plate 710. Essentially the housing 720 can fold onto the base plate 710 (as shown in FIGS. 5 and 6).

Enclosed with the housing 720 can be a transverse plate 725. The transverse plate 725 can be a generally flat piece of metal or can have any other shape capable of performing the function which will be described below. Transverse plate 725 can have two terminal ends each of which is dispose through the respective opposing walls 721. As shown in FIG. 3, there can be a slot 724 (e.g., an elongated through opening) disposed on the opposing wall 721 to the left of the figure, thereby allowing the left terminal end of the transverse plate 725 to pass therethrough. The right terminal end of the transverse plate 725 can have two equally long extension legs 740 that extend in the direction to the right of the figure. Extension legs 740 can pass through two corresponding openings in the opposing wall 721 on the right. Each of the extension legs 720 is sufficiently long for a compression spring 726 to fit over the extension leg 720 on the interior side of the housing 720. As illustrated in FIG. 3, there can be a compression spring 726 disposed over each of the two extension legs 720, providing a compression load when the transverse plate 725 is forced towards the right, compressing the springs 726. Compression springs 726 are not sufficiently small to pass through the two through openings through which the two extension legs 740 pass. As such, the opposing wall 721 on the right side offers a point of resistance as the two compression springs 726 are forced to shorten.

Figure 5:
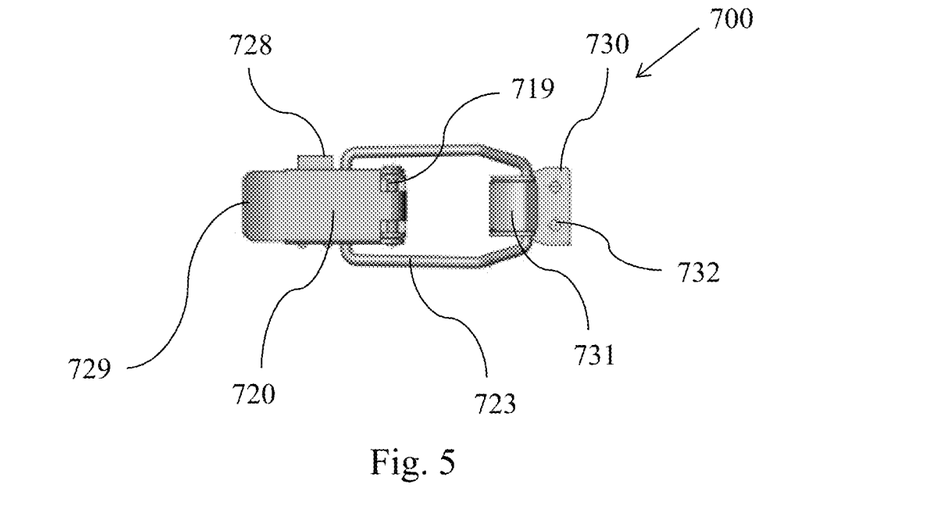
FIG. 5 is a top view of one embodiment of a lockable toggle latch where the housing is folded onto the base plate, according to an aspect of the disclosure.
Figure 6:
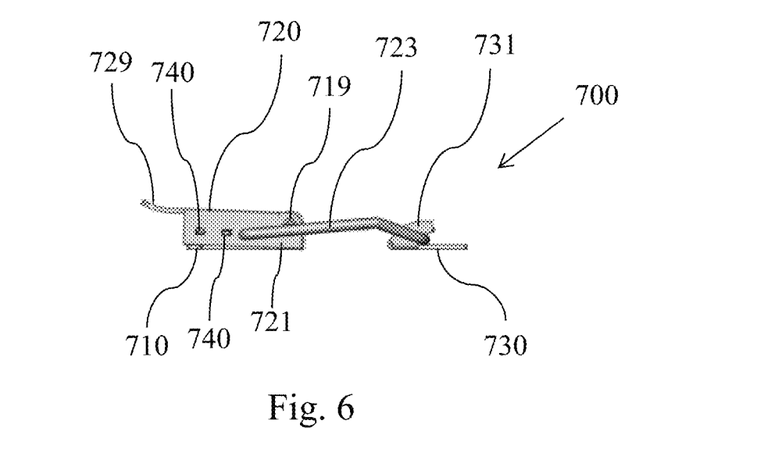
FIG. 6 is side top view of the lockable toggle latch of FIG. 5, according to an aspect of the disclosure.

Referencing FIG. 3, on the left terminal end of the transverse plate 725 there can be a push button 728 (as shown in FIG. 5) disposed on the outside of the housing 720 and a notch disposed along a length of the transverse plate 725. The push button 728 can be a portion of the transverse plate 725 that extends through and beyond the opposing wall 721. The push button 728 allows a consumer to manually press it thereby moving the transverse plate 725 in a direction towards the springs 726 to load the compression springs 726. The notch is enclosed between the two opposing walls 721. The notch can have at least two edges, one of them is the locking edge 727 disposed linearly along a direction parallel to the longitudinal axis of the toggle latch 700.

In operation, before the housing 720 is folded onto the base plate 710, a locking edge 727 of the transverse plate 725 cannot be engaged with the locking arm 715 of the base plate 710. When the housing 720 begins to fold onto the base plate 710 (e.g., by maneuvering the thumb extension 729 on the housing 720), the locking edge 727 starts out being naturally biased by the springs 726 away from the springs 726 in its most distal position. Then, while in its most distal position, the locking edge 727 makes abutting contact with the ramp surface 716 when the housing 720 continues to fold onto the base plate 710. Upon further depressing force to fold the housing 720 onto the base plate 710, the slanted ramp surface 716 forces the locking edge 727 to move against the biasing force of the springs 726 thereby moving the transverse plate 725. When the transverse plate 725 is sufficiently displaced towards the springs 726 and allows the lower edge of the ramp surface 716 to surpass the locking edge 727, the transverse plate 725 and the locking edge 727 then move back into its most distal position by the biasing force of the springs 726. Now the housing 720 is locked onto the base plate 710.

To unlock the housing 720 from the base plate 710, one would press the button 728 (shown in FIG. 5) thereby moving the transverse plate 725 towards the springs 726. This would allow the ramp surface 716 and the locking arm 715 to retreat from the locking edge 727.

Similar to a typical toggle latch, the housing 720 can have a catch arm 723 pivotally coupled thereon. The catch arm 723 can have a metal cylindrical body forming a loop. In one embodiment, the catch arm 723 can be a U-bolt latch and can have two terminal ends inserted through the two opposing side walls 721. Catch arm 723 functions by looping over a hook 731 of a corresponding hook bracket 730 which can be secured (via a screw through screw hole 732) onto an adjacent panel 611, 612. FIG. 4 shows a different angle of the toggle latch 700 of FIG. 3.

In FIG. 5, the toggle latch 700 is locked and the catch arm 723 is latched onto the lock bracket 730. To release this toggle latch 700 from this locked position, one may press the button 728 disposed on the side of the housing 720 to unlock it. FIG. 6 shows a side view of the toggle latch 700 of FIG. 5. In this view, the push button 728 is not shown while the two extension legs 740 of the transverse plate 725 is shown disposed through the opposing wall 721 of the housing 720. Thumb extension 729 can flare out and up away from the housing 720.

While toggle latches 700 with a lockable feature is being illustrated throughout this specification, other types of fasteners can be used. In one embodiment, it be use other known types of quick-release mechanical mechanism. In another embodiment, it can use other known types of quick-release mechanical mechanism with a locking feature.

Figure 7:
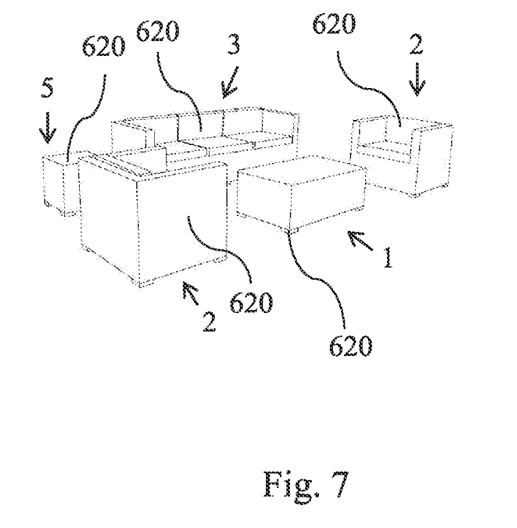
FIG. 7 illustrates the various types of furniture pieces (with outer coverings shown) implementing the contemplated internal frame system according to an aspect of the disclosure.
Figure 8:
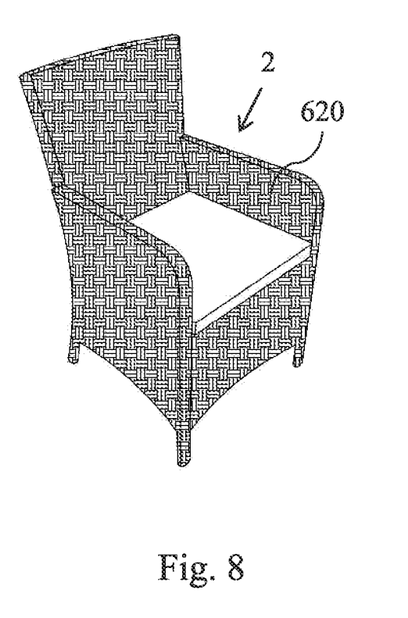
FIG. 8 illustrates a type of armchair (with outer coverings shown) implementing the contemplated framing system according to an aspect of the disclosure.
Figure 9:
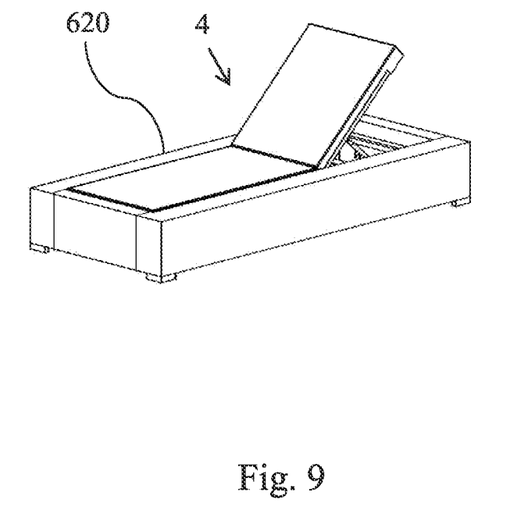
FIG. 9 illustrates a lounge chair/chaise (with outer coverings shown) implementing the contemplated framing system according to an aspect of the disclosure.

FIGS. 7-9 illustrate various implementations of the herein contemplated furniture system comprising panels made of internal frame and outer covering coupled together with a lockable toggle latch. Such implementations include coffee table 1, armchair 2, sofa 3, lounge chair/chaise 4, and side table 5. In one contemplated embodiment, such implementation can include furniture pieces, especially those preferred to have a relatively light weight. In all the examples shown, an outer covering 620 is provided and secured on each panel such that the outer covering 620 stays on its respective panel before, during, and after assembling. In some embodiments, the outer covering 620 can be disposed on at least one side of panel, or at least covering the portions of the internal frame that would have been in plain view as the furniture is assembled had it not been covered. In some embodiments, the internal frame and the toggle latches can be accessible from an opposite side of the panel not covered by the outer covering 620.

The contemplated outer covering 620 can include all suitable materials to provide aesthetic beauty, such materials include natural and synthetic polymers, naturally occurring materials, textile fibers, and synthetic rattan.

Figure 10:
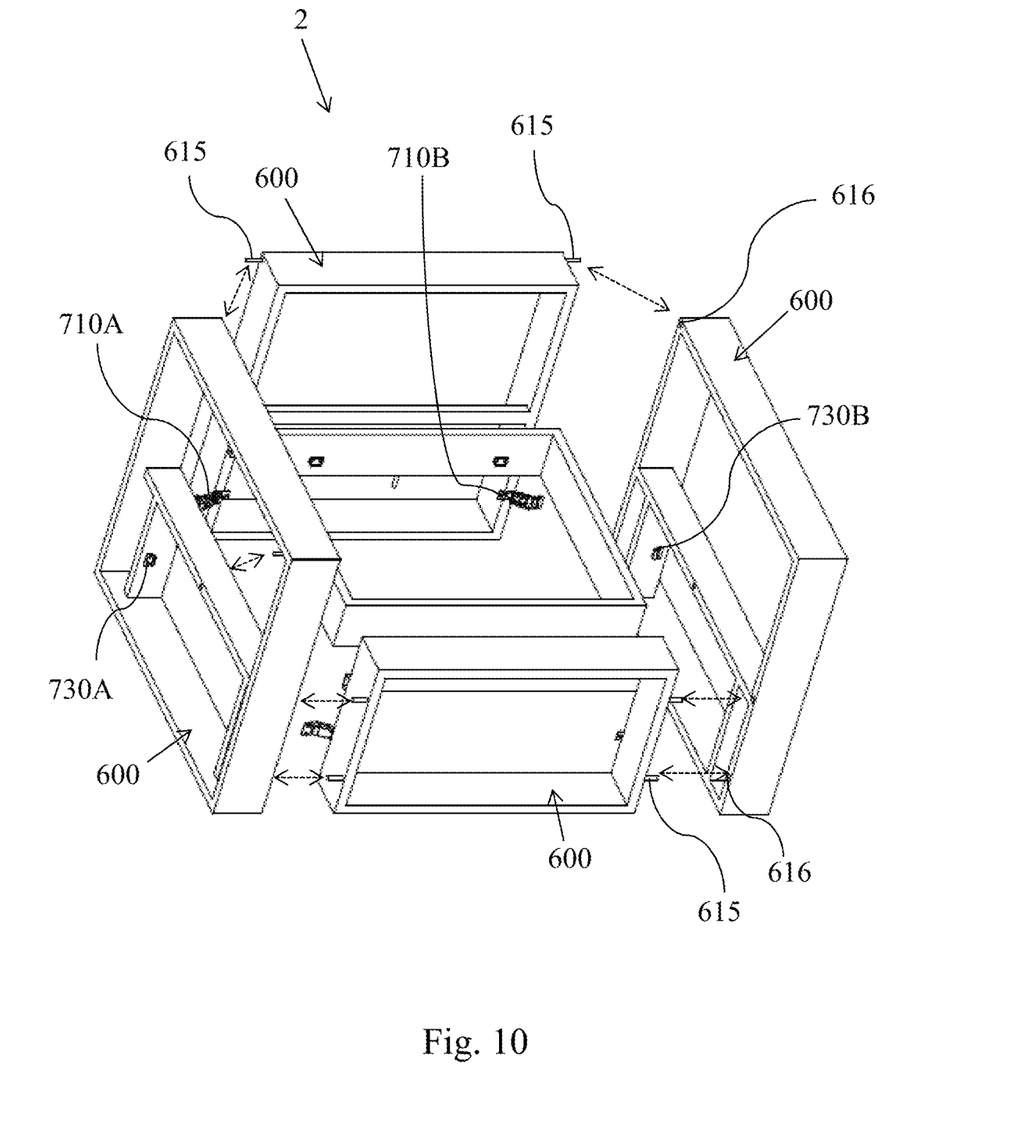
FIG. 10 illustrates an armchair (with outer coverings not shown for ease of illustrating the location of toggle latches) where the internal frame includes boards, according to an aspect of the disclosure.

In FIG. 10, an example of an internal frame 600 made of board-like material is shown. Here, an armchair 2 can have five panels: two arm panels, one seat panel, one lower front side panel, and a tall back panel. Each of these panels can be made of an internal frame 600. These internal frames 600 can each have a separate outer covering (not shown for purpose of illustrating the toggle latches) secured onto them. The board-like material can be in a plank configuration. At appropriate locations on the internal frame 600 there can be complementary parts of toggle latch 700 as described before. Here, base plate 710A lines up with hook bracket 730A, likewise, base plate 710B lines up with hook bracket 730B. Additionally, there can be pegs 615 and corresponding holes 616 provided on the internal frames 600 thereby allowing adjacent panels to line up. Pegs 615 can be fully inserted into holes 616.

As used herein, the term "board" in conjunction with a framing material or shape refers to generally flat piece of hard material which may or may not be porous. Such material can include all suitable materials to provide structural integrity, such materials include natural and synthetic polymers, various metals and metal alloys, naturally occurring materials, textile fibers, glass and ceramic materials, wood, particle board, and all reasonable combinations thereof.

Operation of the frame assembly is straightforward. When each panel taken out of storage, or out of the packaging, the end consumer would match up complementary parts of a toggle latch 700. In one embodiment, toggle latches 700 are installed on the inside of a furniture piece so that once fully assembled, none of the toggle latches 700 can be seen in plain view. Therefore, an end consumer can readily see for each individual panel piece that there is an exterior side of the panel (which would be in plain view when the furniture piece is assembled) that is usually fully covered by an outer covering, and an interior side of the panel which is usually partially or fully exposed to show toggle latches 700. The end consumer can line up these panels so that their interior side face each other and the complementary parts of toggle latches 700 match up.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of a quick-assembly furniture design have been disclosed. It should be apparent, however, to those skilled in the art that many more modifications besides those already described are possible without departing from the disclosed concepts herein. In interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

What is claimed is:

1. A furniture piece comprising:
a plurality of panels each having an internal frame and an outer covering;
the internal frame provides structural integrity to each of said plurality of panels;
the outer covering individually and fixedly disposed over the internal frame of each of said plurality of panels;
wherein the internal frame is comprised of a hollow metal tubular body or a board;
a plurality of couplers fixedly fastened on said internal frame to detachably couple one of the plurality of panels to an adjacent one of the plurality of panels;
wherein each of said plurality of couplers includes a toggle latch;
wherein said toggle latch has a hook bracket and a catch arm; wherein the catch arm is pivotable from a base plate;
wherein the furniture piece is at least one selected from a group consisting of an armchair, a lounge chair, a sofa, a side table, and a coffee table.

2. The furniture piece as recited in claim 1, wherein the catch arm is a U-bolt latch to correspondingly couple to the hook bracket.

3. The furniture piece as recited in claim 2, wherein the toggle latch has a pivoting plate with two opposing walls, and wherein the U-bolt latch has two terminal ends inserted through to the two opposing side walls.

4. The furniture piece as recited in claim 3, wherein the pivoting plate is pivotally coupled to the base plate.

5. The furniture piece as recited in claim 4, wherein the pivoting plate has a thumb extension disposed to flare out from the pivoting plate.

6. The furniture piece as recited in claim 5 further comprising a transverse plate movably disposed through the two opposing walls.

7. The furniture piece as recited in claim 6 further comprising a spring disposed between the transverse plate and one of said two opposing walls to bias the transverse plate in a transverse direction perpendicular to a longitudinal axis of the two opposing walls.

8. The furniture piece as recited in claim 7, wherein a terminal end of the transverse plate opposite to the spring extends beyond one of said two opposing walls and forms a push button, thereby allowing a user to press the push button against a biasing force of the spring.

9. The furniture piece as recited in claim 8, wherein the transverse plate has a notch disposed along a length of the transverse plate and is enclosed between said two opposing walls, where the notch includes a locking edge.

10. The furniture piece as recited in claim 9 further comprising a locking arm having a ramp surface, wherein the locking arm is fixedly disposed on the base plate, and the ramp surface biases against the locking edge thereby moves the transverse plate against the biasing force of the spring when the pivoting plate pivots onto the base plate.

11. The furniture piece as recited in claim 10, wherein pressing of the push button allows the locking edge to be released from the locking arm.

12. The furniture piece as recited in claim 11, wherein the outer covering is disposed on one side of each of said plurality of panels, and the toggle latch is accessible from an opposite side not covered by the outer covering.

13. The furniture piece as recited in claim 11, wherein the outer covering includes a synthetic rattan.

14. The furniture piece as recited in claim 11, wherein the plurality of panels includes a top panel and a side panel, wherein each panel has a generally flat configuration.

15. The furniture piece as recited in claim 14, wherein each panel has a hollow interior formed by the internal frame.

* * * * *